United States Patent [19]
Floch et al.

[11] Patent Number: 5,698,266
[45] Date of Patent: Dec. 16, 1997

[54] PROCESS FOR THE PRODUCTION OF THIN COATINGS HAVING OPTICAL AND ABRASION RESISTANCE PROPERTIES

[75] Inventors: HervéFloch, Brunoy; Philippe Belleville, Courbevoie, both of France

[73] Assignee: Commissariat a l'Energie Atomique, Paris, France

[21] Appl. No.: 823,831

[22] Filed: Mar. 25, 1997

Related U.S. Application Data

[63] Continuation of Ser. No. 530,220, filed as PCT/FR94/00368, Mar. 31, 1994, published as WO94/23315, Oct. 13, 1994, abandoned.

[30] Foreign Application Priority Data

Apr. 5, 1993 [FR] France ................... 93 03987

[51] Int. Cl.⁶ ................................................. B05D 3/02
[52] U.S. Cl. ................... 427/376.2; 427/377; 427/397.7; 427/419.2
[58] Field of Search ............... 427/376.2, 397.7, 427/377, 419.2

[56] References Cited

U.S. PATENT DOCUMENTS

| | | | |
|---|---|---|---|
| 4,271,210 | 6/1981 | Yoldas | 427/169 |
| 4,293,593 | 10/1981 | Yoldas | 427/106 |
| 4,446,171 | 5/1984 | Thomas | 427/160 |
| 4,496,398 | 1/1985 | Whitehouse | 106/181 |
| 4,891,176 | 1/1990 | Drysdale et al. | 264/250 |
| 4,929,278 | 5/1990 | Ashley et al. | 106/287.12 |
| 4,966,812 | 10/1990 | Ashley et al. | 428/412 |
| 5,153,031 | 10/1992 | Burlitch | 427/226 |
| 5,356,667 | 10/1994 | Hench et al. | 427/584 |
| 5,476,717 | 12/1995 | Floch | 428/421 |

FOREIGN PATENT DOCUMENTS

| | | | |
|---|---|---|---|
| 0 366 979 | 5/1990 | European Pat. Off. | B29C 67/14 |
| 0 441 249 | 8/1991 | European Pat. Off. | A63B 49/10 |
| 0 533 521 A1 | 3/1993 | European Pat. Off. | G02B 1/10 |
| 0 722 825 | 7/1996 | European Pat. Off. | B29C 70/48 |
| 0 722 826 | 7/1996 | European Pat. Off. | B29C 70/48 |
| 2 440 261 | 5/1980 | France | B29C 6/00 |
| 2680583 | 2/1993 | France | G02B 1/10 |
| WO 91/00171 | 1/1991 | WIPO | B29C 67/14 |

OTHER PUBLICATIONS

Musket et al., "Enhanced Adhesion At Oxide/Oxide Interfaces By Ion Beam Stiching," *Appl. Phys. Lett.* vol. 52(No. 5), pp. 410–412 (1988).

Floch et al., "Colloidal Sol–Gel Optical Coatings," *Ceramic Bulletin*, vol.69(No. 7), pp. 1141–1143 (1990).

*Primary Examiner*—Benjamin Utech
*Attorney, Agent, or Firm*—Burns, Doane, Swecker & Mathis LLP

[57] ABSTRACT

The present invention relates to a process for the production of thin coatings having optical and abrasion resistance properties.

The object of the invention is to produce optical thin coatings having good mechanical strength characteristics, i.e. a good resistance to abrasion and an adequate adhesion to the substrate on which they are deposited.

This object is achieved with the aid of a process comprising at least one cycle constituted by stages consisting of:
  applying to a substrate (1) at least one antireflection sol-gel coating (3) constituted by a colloidal silicon oxide suspension dispersed in an aliphatic alcohol,
  allowing said antireflection coating (3) to dry,
  subjecting the substrate (1) covered with said colloidal silica coating (3) to an alkaline treatment in a liquid or gaseous medium.

9 Claims, 3 Drawing Sheets

PROCESS FOR THE PRODUCTION OF THIN COATINGS HAVING OPTICAL AND ABRASION RESISTANCE PROPERTIES

This application is a continuation, of application Ser. No. 08/530,220, filed as PCT/FR94/00368, Mar. 31, 1994 published as WO94/23315, Oct. 13, 1994, now abandoned.

The present invention relates to a process for the production of thin coatings having optical and abrasion resistance properties.

The thin coatings are constituted by a film having certain specific optical properties, e.g. antireflection or reflecting properties, said film being deposited on an organic or inorganic substrate (i.e. particularly plastics or vitreous substrates). These thin coatings have numerous applications and in particular in the fields of high power lasers, solar, thermal and photovoltaic applications, integrated optical systems or architectural applications such as for externally glazed panels. These thin coatings are also used in optical systems for minimizing thermal losses, concentrating and focussing light energy and protecting certain absorbent elements.

Various processes for the production of these thin coatings have been developed and in particular synthesis by gentle chemistry, i.e. the deposition by the sol-gel procedure, the special feature of which is the elimination of the high temperature heat treatment stage.

Among the sol-gel deposition processes, one consists of preparing treating solutions of a colloidal nature and depositing them on a substrate. In other words, said procedure consists of forming a stable, homogeneous suspension of solid particles (colloids) dispersed in a liquid solvent, said suspension constituting what is called a sol and then allowing the solvent to evaporate. In order to produce thin coatings, the solvent used must be sufficiently volatile to evaporate easily and leaving space for a deposition of solid particles on the substrate, the refractive index of the said deposit determining the optical properties thereof.

Various deposition methods can be used. For example, these methods can be dip coating, spin coating, laminar flow coating, spray coating, slip casting or tape casting.

Examples of the production of sol-gel coatings are in particular described in U.S. patent application Ser. No. 7,148,458 (NTIS) corresponding to U.S. Pat. Nos. 4,929,278 and 4,966,812 or U.S. Pat. Nos. 2,432,483 and 4,271,210.

U.S. patent application Ser. No. 7,148,458 (NTIS) describes a process for depositing an antireflection film on plastic substrates, consisting of synthesizing an ethanol gel in the $SiO_2$-$B_2O_3$-$Al_2O_3$-$BaO$ system until a certain molecular complexity is obtained, followed by the reliquefying of said gel by mechanically breaking certain interpolymer bridges. This gives a porous film with a low refractive index (approximately 1.23), produced at ambient temperature, which permits an adaptation to plastic substrates.

U.S. Pat. Nos. 2,432,484 and 4,271,210 disclose the possibility of using silica or alumina colloids for producing antireflection, dielectric coatings, making it possible to increase the porosity of said coatings and therefore lower their refractive index. Although these processes have the advantage of being able to use low temperatures, the colloidal coatings obtained have a very limited mechanical strength and are particularly sensitive to any physical contact.

In addition, the article entitled "Colloidal sol-gel optical coatings", published in The American Ceramic Society Bulletin, vol. 69, No. 7, pp 1141–1143, 1990, describes a sol-gel thin coating deposition process using spin coating.

However, the very nature of these colloidal films, i.e. porous, implies a limited mechanical strength thereof, both from the abrasion standpoint and from the standpoint of adhesion to the substrate on which they have been deposited. Thus, such deposits do not withstand any physical contact, no matter whether it is touching or wiping without being damaged. The only cohesion forces existing in these colloidal films are of the physical adsorption type and there is no chemical bond between the particles and the substrate, or between the actual particles.

The prior art reveals three documents referring to a significant improvement to the mechanical strength of thin optical coatings based on colloidal silica ($SiO_2$).

U.S. Pat. No. 2,432,484 discloses the use of a product formed from alcohol and tetraethyl orthosilicate and serving as a chemical binder between the colloidal particles, so as to reinforce the cohesion of the porous structure. This chemical binder is either applied to the already deposited colloidal silica coating, or is incorporated into the treating medium (i.e. the colloidal sol) and everything is applied in a single treatment. Bearing in mind the chemical binder proportion used, the porosity of the colloidal deposit remains virtually unchanged and therefore the optical properties are maintained. The mechanical strength of the thus reinforced film permits its touching and wiping. Moreover, a supplementary heat treatment of the coating at low temperature, i.e. below 100° C., makes it possible to further improve said strength. However, such a deposit remains vulnerable in the case of a strong abrasive attack.

In addition, an article by R. G. MUSKET et al, Lawrence Livermore National Laboratory of California, published in Appl. Phys. Lett., vol. 52(5), 1988, describes a process for increasing the adhesion of the oxide/oxide interface with the aid of an ion beam. The authors describe a treatment by irradiation at 200 keV with helium $He^+$ ions of antireflection coatings based on porous silica. This treatment improves the adhesion of the particles to one another and of the particles with the substrate, which ensures that the thus treated coating has a resistance to normal optical cleaning (wiping) without any modification to the optical performance characteristics. The explanation given for this phenomenon is based on a surface reactivity of the colloidal particles increased as a result of the ion bombardment.

In addition, French patent application 2,680,583 of the present applicant, discloses a process permitting the deposition on a substrate of abrasion-resistant, thin colloidal coatings. This process involves the use of an adhesion promoting coating (silanes) placed between the substrate and the antireflection coating and a coupling agent coating (silazanes) placed between said antireflection coating and an antiabrasive coating (fluoropolymer). The mechanical strength of this composite film is such that it maintains its integrity, even following an attack with hammer scale, after gumming (20 Shores) or a residence in an ultrasonic acid medium. The thus obtained thin coatings also have a good climatic resistance. However, it takes a long time to carry out this process.

Therefore the present invention aims at solving the aforementioned disadvantages and permitting the obtaining of thin optical coatings with good mechanical strength properties, i.e. a good resistance to abrasion and a satisfactory adhesion to the substrate on which they are deposited.

The invention consequently relates to a process for producing thin coatings having optical and abrasion resistance properties.

According to the characteristics of the invention, this process comprises at least one cycle constituted by the steps of:

applying to a substrate at least one antireflection sol-gel coating constituted by a colloidal suspension of silicon oxide dispersed in an aliphatic alcohol, allowing said antireflection coating to dry and making the substrate covered with said colloidal silica coating undergo an alkaline treatment in a liquid or gaseous medium.

As a result of the alkaline treatment, it is possible to harden the deposit of the sol-gel coating, so as to decisively improve its abrasion resistance properties. Moreover, this hardening effect is obtained at ambient temperature, so that it is possible to treat organic substrates, such as e.g. plastic materials.

Preferably, the alkaline treatment is performed by placing the substrate covered with the antireflection coating in an tight enclosure filled with ammonia vapours.

Following the ammonia treatment, the thin coating is able to withstand physical contact, i.e. touch with gloves and also several wiping operations using optical paper soaked in alcohol, i.e. drag-wiping, without visible macroscopic damage and without any deterioration to the optical performance characteristics. The effect of the ammonia vapours from the optical standpoint is the displacement of the antireflection function towards short wavelengths. Finally, this process is easy to perform and also inexpensive.

BRIEF DESCRIPTION OF THE DRAWINGS

The invention is described in greater detail hereinafter relative to an illustrative and non-limitative embodiment, with reference to the attached drawings, wherein show:

As illustrated in FIG. 1, the thin coating is deposited on a substrate 1, which can be organic or inorganic.

Throughout the remainder of the description, the term "organic substrate" more specifically designates a plastic substrate, e.g. one of those chosen from among polyacrylates, polycarbonates, polyallyl carbonates and polyamides. However, this list is not limitative and covers in more general terms polymer materials.

The term "inorganic substrate" more specifically covers a vitreous substrate, e.g. amorphous or even crystalline materials and in particular silica, borosilicate glasses, but excluding fluorophosphates and phosphates.

Prior to any deposition, the substrate is cleaned, e.g. using dilute hydrofluoric acid and a detergent solution.

Figure 1:
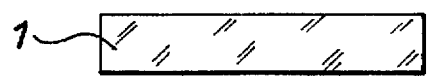
FIG. 1 A diagram illustrating a substrate which can be organic or inorganic.
Figure 2:
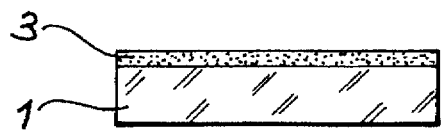
FIG. 2 A diagram illustrating an antireflection coating deposited on a substrate.

As illustrated in FIG. 2, an antireflection coating 3 is deposited on the substrate 1. This antireflection coating 3 is prepared according to the sol-gel procedure. It is pointed out that a sol is a colloidal medium and that a gel is an elastic, viscous mass formed from colloidal suspensions and solutions and which has a set liquid structure. In conventional manner, said antireflection coating 3 is obtained from a suspension of monodisperse silica colloids with an approximate diameter of 100 to 200 Å, dispersed in a solvent.

The colloidal solution is synthesized from a molecular precursor preferably chosen from among alkoxides of formula $M(OR)_n$, M representing a metal or a metalloid, OR an alkoxy radical with 1 to 6 carbon atoms and n representing the valency of the metal. In the present case, the silica sol can be obtained by hydrolysis of a precursor such as e.g. tetraethyl orthosilicate in a basic alcoholic medium. The aliphatic alcohol currently used as the solvent is e.g. ethanol. However, it is also possible to use other precursors such as tetramethyl orthosilicate or other silicon alkoxides. It is also possible to use a mineral precursor (metal salt).

The deposition of the antireflection coating 3 can take place by one of the methods referred to hereinbefore.

The substrate 1 covered by the antireflection coating 3 then undergoes an alkaline treatment in the liquid or gaseous phase.

Figure 3:
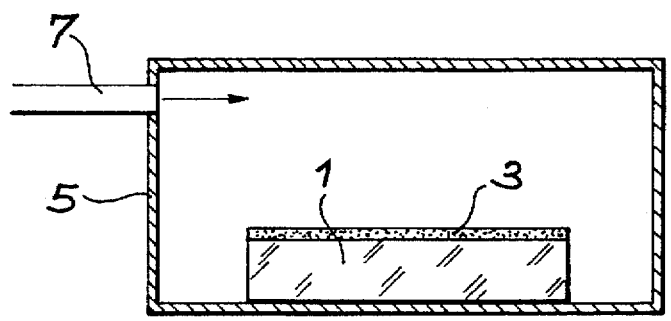
FIG. 3 A diagram illustrating an embodiment of alkaline treatment in which a substrate covered with an antireflection coating is placed in a sealed or tight enclosure within which ammonia vapours ($NH_3$) are introduced through an orifice.

FIG. 3 illustrates a first embodiment of the alkaline treatment, in which the substrate 1 covered with the antireflection coating 3 is placed in a sealed or tight enclosure 5 within which ammonia vapours ($NH_3$) are introduced through the orifice 7.

Figure 3A:
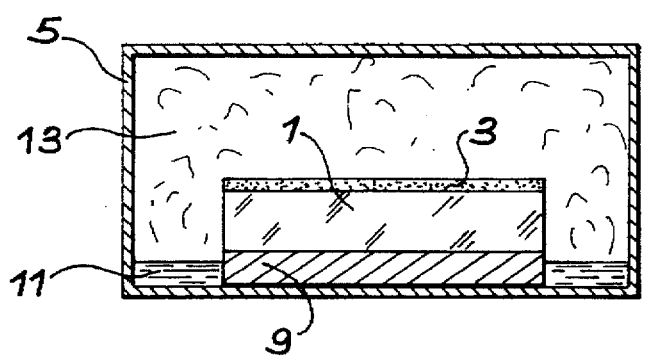
FIG. 3A A diagram illustrating a variant of an embodiment of alkaline treatment in which a substrate covered with an antireflection coating is placed with the covered face upwards on a support within a tight enclosure and a volatile, aqueous ammonia solution is placed in the bottom of the enclosure so as to produce ammonia vapours.

FIG. 3A illustrates a variant of the first embodiment, in which the substrate 1 covered with the antireflection coating 3 is placed with the covered face upwards on a support 9 within the tight enclosure 5. A volatile, aqueous ammonia solution 11 is placed in the bottom of the enclosure, so as to produce ammonia vapours 13.

In the two aforementioned variants, the duration of the ammonia vapour treatment is between 2 and 24 hours. The ammonia concentration is between 5 and 50 wt. %.

Figure 4:
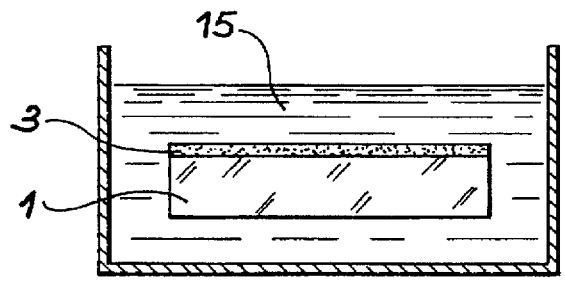
FIG. 4 A diagram illustrating an embodiment of alkaline treatment in which a substrate covered with an antireflection coating is immersed in an alkaline solution.

Although these two variants of the first embodiment of the alkaline treatment are preferred, it is also possible to carry out this treatment by immersing the substrate 1 covered with the antireflection coating 3 in an alkaline solution 15, as illustrated in FIG. 4. The alkaline solution 15 is chosen from among soda (NaOH), potash (KOH), tetramethyl ammonium hydroxide ($N(CH_3)_4OH$, hydroxl amine ($NH_2OH$), diethanol amine ($NH(CH_2OHCH_2)_2$) or ammonia ($NH_4OH$). These alkaline solutions are diluted in a weakly dissociating solvent, i.e. having a low dielectric constant $\epsilon$. This solvent is e.g. chosen from among aliphatic alcohols, preference being given to the use of ethanol.

It should be noted that the use of basic aqueous solutions with a pH above 9 leads to no improvement to the abrasion resistance and instead causes a leaching of the deposited sol-gel coating.

After the alkaline treatment and in particular after the ammonia treatment it has been found that the antireflection coating 3 was able to withstand a physical contact, i.e. could be handled with gloves and could also withstand several drag-wipe operations, without deterioration and without any reduction of the optical performance characteristics. It was also found that there was a modification to the optical properties of the thus treated coating.

Figure 5:
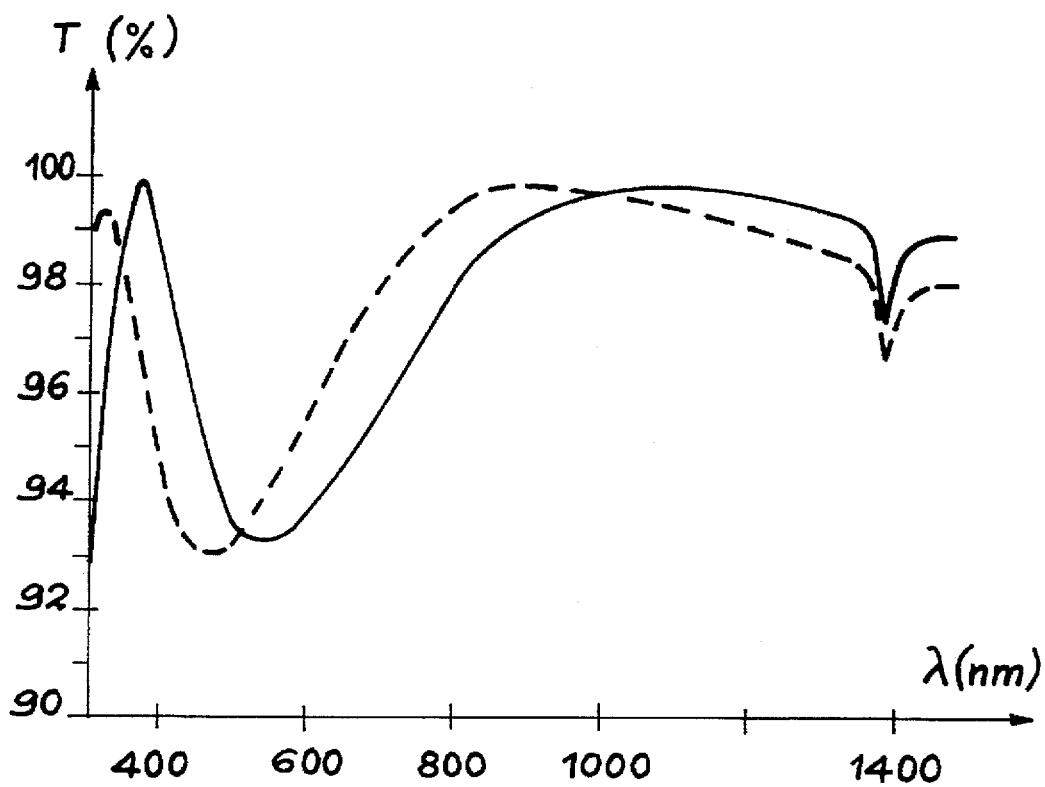
FIG. 5 A graph illustrating the optical transmission variation (T) of different thin coatings, as a function of the wavelength ($\lambda\lambda$), FIG. 6 A graph showing the optical transmission peak value ($\lambda/4$) as a function of the treatment time of the thin coating by concentrated ammonia vapours.

FIG. 5 illustrates the effect of the treatment by ammonia vapours on the antireflection optical function of the thin coating 3. The continuous line curve illustrates the optical transmission value obtained for a substrate 1 covered by a thin antireflection coating 3 not treated by ammonia vapours. The dotted line curve illustrates the results obtained after a treatment with ammonia vapours.

FIG. 5 shows that the ammonia vapour treatment optically leads to the displacement of the antireflection function towards lower wavelengths. The extent of the displacement of the transmission maximum (peak) is directly linked with that of the ammonia treatment, i.e. the concentration of the ammonia vapours used and the duration of the treatment. The displacement of the peak optically represents the physical phenomenon of the thickness reduction of the thin coating, because the deposited thickness is proportional to the position of the transmission peak.

Figure 6:
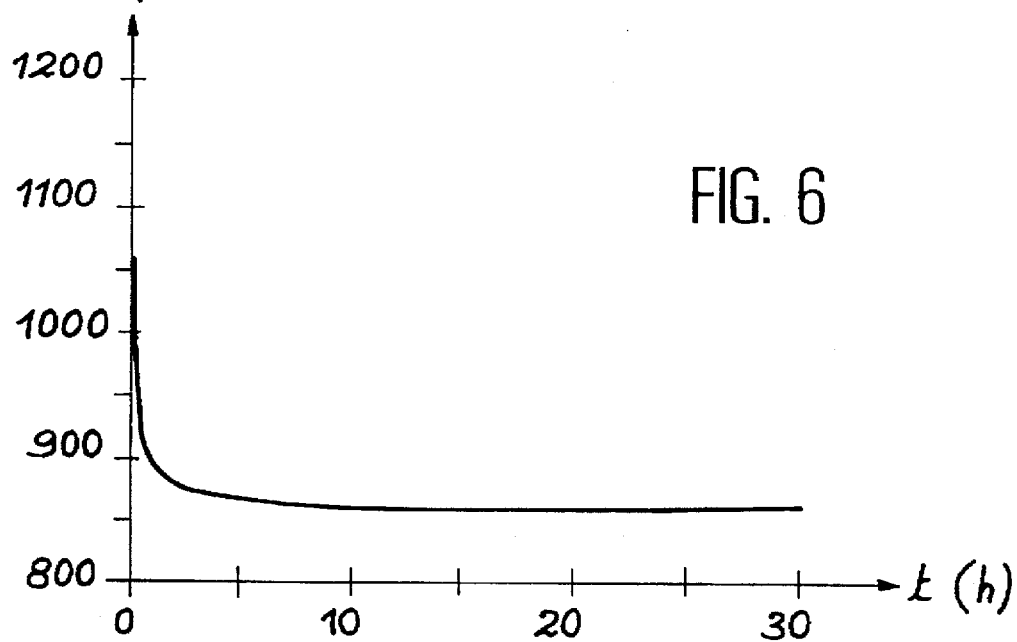

FIG. 6 illustrates this variation of the displacement of the transmission peak ($\lambda/4$) of a $SiO_2$ monolayer, as a function of the residence time in the concentrated ammonia vapours. Account must be taken of this displacement for the optimization of the antireflection function at a given wavelength after the ammonia treatment. During this spectral evolution, it is pointed out that the drift of the peak ($\lambda/4$) towards short wavelengths is not accompanied by any modification to its amplitude (maximum transmission value $T_{max}$). The only effect of the ammonia is to translate the photometric spectrum.

This means that the antireflection coating 3 undergoes a thickness reduction without any variation to the refractive index, so that the porosity of the coating is maintained. The thickness variation of the thin coating represents a total reduction of approximately 20% compared with its initial value. This equilibrium is reached after about 20 hours spent in the ammonia vapours and is irreversible.

The spectral observations (thickness reduction of the film) and the improvement to its mechanical properties, i.e. the possible wiping thereof without any deterioration are only compatible with the following interpretation of the phenomenon. Following deposition, the thin antireflection coating 3 is formed from silica colloids, whose surface is hydroxylated. This means that the surface sites of the particles are silanols (Si—OH). The presence of alkaline vapours serves as a catalyst for surface condensation reactions of said silanol sites, in accordance with the nucleophilic attack mechanism proposed by R. K. ILER, "The chemistry of silica", Wiley, New York, 1979:

Figure 7:
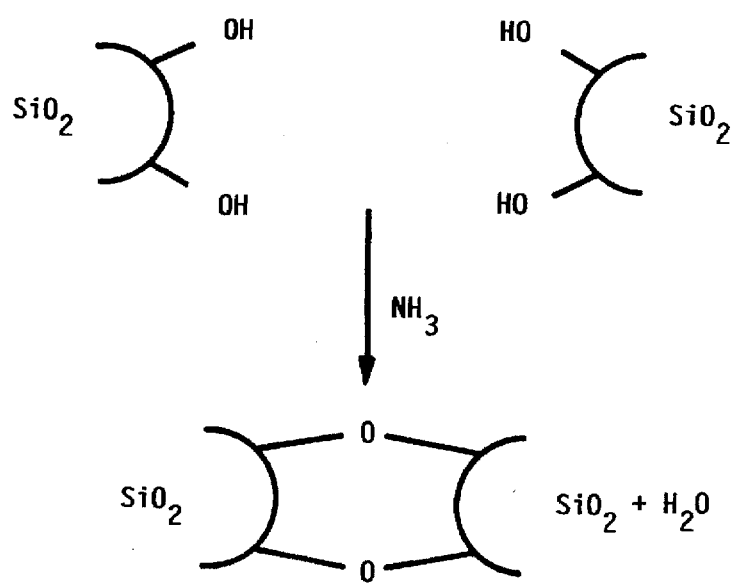
FIG. 7 A diagram illustrating a chemical reaction in which surface silanols (Si—OH) are deprotonated and interparticular chemical bonds are formed by oxolation.

This reaction amounts to a surface deprotonation and to a formation of interparticular chemical bonds by oxolation, as illustrated in FIG. 7.

The surface crosslinking of the silica particles reinforces the mechanical cohesion of the antireflection coating and enables the latter to better resist abrasive actions. Moreover, the surface dehydroxylation (elimination of water molecules) represents a physical moving together of the colloids and consequently an overall thickness reduction of the coating 3. The coating thickness reduction is not sufficient to modify its compactness. The porosity remains virtually unchanged and the refractive index is maintained.

Finally, linked with the improvement to the mechanical strength and to the modifications to the optical properties, the laser flux resistance performance characteristics are also better in the case of the colloidal silica antireflection coatings treated with ammonia. There is an improvement of approximately 20% in the laser damage threshold value in Joule/$cm^2$ following the ammonia treatment. This threshold rise is verified at different wavelengths (1064 nm to 355 nm), as well as with different laser pulse durations (15 ns to 0.5 ns).

It is possible to carry out a single deposition cycle comprising the deposition of the antireflection coating, the drying and the alkaline treatment (cf. example 1 hereinafter), but it is also possible to perform several successive cycles or even alternate between each complete cycle, the deposition of another colloidal coating not treated by alkaline vapours (cf. example 2 hereinafter).

Hereinafter are given two performance examples for the process according to the invention.

EXAMPLE 1 a) Preparation of the substrate

The substrate 1 used is a borosilicate glass substrate (type BK-7, manufactured by Schott), with a diameter of 300 mm and a thickness of 10 mm. The polishing quality is $1\lambda$ ($\lambda$ equals 1064 nm) and the refractive index is 1.51 at a wavelength of 600 nm. This substrate 1 is firstly cleaned according to the following procedure. The cleaning of the surface to be covered is carried out with a 1 vol. % dilute hydrofluoric acid solution. This surface is then rinsed with pure, deionized water and cleaned with a green soap detergent solution ("Green Soap", Eli Lilly. Co). Finally, said surface is rinsed with pure water and then ethyl alcohol filtered to 0.2 μm.

b) Preparation and deposition of the thin antireflection coating

A colloidal suspension is prepared by mixing 1046.3 g of absolute ethanol with 136.7 g of distilled tetraethyl orthosilicate (167° C., $10^5$ Pa). The mixture is homogenized by stirring for 5 min. Whilst maintaining said stirring, addition then takes place of 36.3 g of min 28 wt. % ammonia. The hydrolysis reaction requires a minimum of 48 hours at 25° C. in order to be complete. There is then an opalescence revealing the formation of silica colloids. The grain size measurement performed reveals an average colloid diameter of 21±9 nm. The final pH of said sol is approximately 10.5 and the $SiO_2$ mass concentration is brought from 3.2% to 1.5% with ethanol. Prior to being used said silica sol is filtered to 0.2 μm.

On the substrate 1 cleaned in the manner described hereinbefore is deposited by spin coating and on one face only, a silica sol coating 3 at 350 r.p.m. The film is dried for 5 minutes. The thus treated substrate reveals by spectrophotometry the following transmission factors:

T=95.8% at 1100 nm (maximum),
T=95.6% at 1200 nm,
T=95.4% at 1000 nm.

The precision is ±0.3%. The refractive index of the $SiO_2$ coating is 1.22 at 1060 nm under these deposition conditions, which corresponds to a porosity of the coating of approximately 50%.

c) Treatment of the substrate

The substrate 1 coated with the thin coating 3 is placed with the covered face upwards on a support in a tight enclosure having a volume of 6 dm3, containing approximately min 500 cm³ of 28 wt. % ammonia in its bottom. The 28 wt. % ammonia solution corresponds to a standard commercial solution. The substrate 1, 3 is kept is ammonia confinement for a minimum of 12 hours.

d) Results

The following properties result from this treatment:

the optical transmission is maintained and reaches 95.8% at 900 nm (maximum)

the mechanical abrasion resistance and improved adhesion properties of the thin coating permit physical contact and drag-wiping, the laser flux resistance values exceed 18 J/cm² with a pulse duration of 3 ns at 1064 nm and exceed 50 J/cm³ at 8 ns and 1064 nm.

Figure 8:
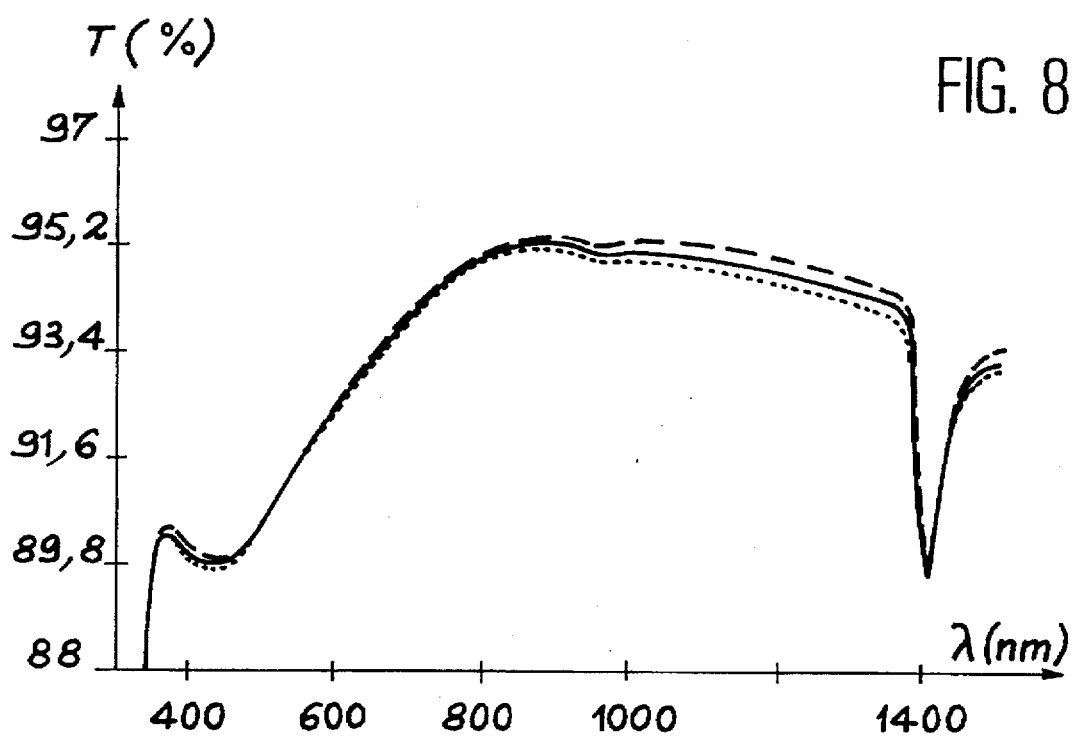
FIG. 8 A graph showing the optical transmission variation (T) as a function of the wavelength ($\lambda$) for antireflection coatings according to the invention which have undergone various tests.

Finally, the optical performance characteristics obtained are time-stable and insensitive to wiping (cf. FIG. 8). The continuous line curve illustrates the results obtained with a $SiO_2$ monolayer treated with ammonia vapours, whereas the dotted line curve illustrates the results obtained with the same monolayer which has undergone drag-wiping operations, whilst the broken line curve illustrates the results obtained with a $SiO_2$ monolayer, treated with ammonia vapours and aged for at least 10 days. The almost perfect juxtapositioning of the these three curves shows that the ammonia-treated coating is able to withstand the wiping test without any optical changes and that said treatment is irreversible and stable.

It is possible to repeat the deposition of the colloidal silica antireflection coating 3 on the other face of the substrate 1 and again carry out the ammonia vapour treatment. The same mechanical strength and laser flux resistance characteristics are then obtained on both faces with optical transmission values reaching 99.8% at 900 nm, 99.5% at 1000 nm and 99.4% at 800 nm.

EXAMPLE 2 a) Preparation of the substrate

The substrate used is identical to that of example 1, except that its diameter is 200 mm. The preparation and cleaning of its surface are identical.

b) Preparation and deposition of the thin antireflection coating and alkaline treatment The colloidal silica suspension is prepared in the same way as described in example 1. Preparation also takes place of a colloidal aluminium hydroxide suspension by vigorously hydrolyzing 246 g of sec aluminium butoxide (1 mole) in 3000 g of deionized water (166 moles) at 65° C. This gives a voluminous, whitish, aluminium hydroxide precipitate. This is followed by the extraction of isobutanol by distillation at 98° C. and atmospheric pressure (~$10^5$ Pa) and refluxing takes place at 100° C. The precipitate is then peptized by adding 7.0 g of concentrated hydrochloric acid (0.07 mole) and total refluxing is maintained for approximately 15 hours. This gives a finely divided colloidal sol with an opalescent appearance of the aluminium hydroxide particles (boehmite type) of parallelepipedic morphology (40×20×50 nm). The distribution of these particles is monodisperse. This aluminium hydroxide sol is concentrated in vacuo until 12% $Al_2O_3$ is reached (425 g). In this way a product is obtained in the form of a gelatinous paste, which can easily be redispersed ultrasonically in light aliphatic alcohols. The sol obtained is then refluidized by 3.5% $Al_2O_3$ dilution in pure methanol. The pH of the sol is brought from 3.5 to 5.5 by adding propylene oxide (1,2-epoxy propane), which neutralizes the excess hydrochloric acid without losing the stability of the colloidal sol. The added propylene oxide proportion corresponds to a molar ratio (propylene oxide/hydrochloric acid) of 1 in the mixture and the pH equilibrium is only reached after stirring for several days. Prior to use, this sol is diluted to 2.5% with methanol and filtered on a glass fibre screen.

On the cleaned substrate 1 is deposited by spin coating a silica sol coating at 250 r.p.m. The drying of said coating lasts 5 minutes. The silica coating 3 is then treated with the aid of ammonia alkaline vapours in a tight enclosure, as in example 1, for 15 minutes. In this case an alkaline treatment lasting approximately 15 minutes is sufficient, because the aim is to increase the mechanical strength of the silica coatings and permit their stacking without scaling.

This is followed by the deposition of an aluminium hydroxide sol coating at 600 r.p.m. The alumina deposit is left in the open air for 10 minutes for drying purposes.

This alternate deposition procedure is repeated several times until a mirror is obtained having in all 37 coatings, i.e. 19 $SiO_2$ coatings alternating with 18 aluminium hydroxide coatings. The final coating deposited is formed by silica. The stack is left in an ammonia atmosphere for a minimum of 12 hours. This long treatment then makes it possible to obtain the aforementioned mechanical strength properties.

c) Results

The thus produced mirror has a spectral response which, under normal incidence (0°), gives a reflection of 99.2±1% at a wavelength of 1053 nm, 90.0±1.5% at 530 nm and 85.0±1.5% at 351 nm.

This reflecting film 3 is free from cracks, relatively homogeneous and contains monolayers of $SiO_2$ and $Al_2O_3H_2O$, whose respective refractive indices are 1.22 and 1.43 at 1053 nm. The corresponding respective porosities are 50% and 35%.

The mirror obtained in this way has a certain mechanical strength and is able to withstand without damage physical contact, as well as drag-wiping operations. Measurements of the laser damage threshold give 49 J/cm² with a pulse duration of 10 ns, at a wavelength of 1064 and 20 J/cm², at a pulse duration of 3 ns and a wavelength of 1064 nm.

We claim:

1. Process for producing thin coatings having antireflection or reflecting properties and abrasion resistance properties, characterized in that it comprises at least one cycle constituted by the steps consisting of:

applying to a substrate at least one antireflection sol-gel coating constituted by a colloidal suspension of silicon oxide dispersed in an aliphatic alcohol, allowing said antireflection coating to dry, subjecting the substrate covered with said colloidal silica coating to an alkaline treatment in a liquid or gaseous medium.

2. Process for the production of thin coatings according to claim 1, characterized in that the alkaline treatment in a gaseous medium is carried out by placing the substrate covered with the dried antireflection coating in a sealed enclosure filled with ammonia vapours.

3. Process for producing thin coatings according to claim 2, characterized in that the ammonia vapour concentration is between 5 and 50 wt. % within said enclosure.

4. Process for producing thin coatings according to claim 3, characterized in that the duration of the ammonia vapour treatment is between 2 and 24 hours.

5. Process for producing thin coatings according to claim 4, characterized in that a thin coating having antireflection or reflecting properties is deposited without alkaline treatment between each deposition cycle for an antireflection coating having undergone an alkaline treatment or between successive deposition cycles for an antireflective coating having undergone an alkaline treatment.

6. Process for producing thin coatings according to claim 2, characterized in that the duration of the ammonia vapour treatment is between 2 and 24 hours.

7. Process for producing thin coatings according to claim 1, characterized in that the alkaline treatment in the liquid medium is performed by immersing the substrate covered by the dried antireflection coating in an alkaline solution selected from the group consisting of sodium hydroxide, potassium hydroxide, tetramethyl ammonium hydroxide, hydroxyl amine, diethanol amine and ammonia, said alkaline solution being diluted in a solvent having a dielectric constant less than or equal to the dielectric constant of an aliphatic alcohol.

8. Process for producing thin coatings according to claim 7, characterized in that the solvent of the alkaline solution is selected from the group consisting of aliphatic alcohols.

9. Process for producing thin coatings according to claim 1, characterized in that a thin coating having antireflection or reflecting properties is deposited without alkaline treatment between each deposition cycle for an antireflection coating having undergone an alkaline treatment or between successive deposition cycles for an antireflective coating having undergone an alkaline treatment.

* * * * *